H. B. LITTLE.
Adjustable Centering Square.

No. 202,180.          Patented April 9, 1878.

Witnesses:
Rob't F. Gaylord
John Ward

Inventor.
H. B. Little
By W. E. Simonds

UNITED STATES PATENT OFFICE.

HORACE B. LITTLE, OF HARTFORD, CONNECTICUT.

IMPROVEMENT IN ADJUSTABLE CENTERING-SQUARES.

Specification forming part of Letters Patent No. 202,180, dated April 9, 1878; application filed September 27, 1877.

*To all whom it may concern:*

Be it known that I, HORACE B. LITTLE, of Hartford, in the county of Hartford and State of Connecticut, have invented certain new and useful Improvements pertaining to an Adjustable Centering-Square, of which the following is a specification, reference being had to the accompanying drawings, where—

Figure 1:
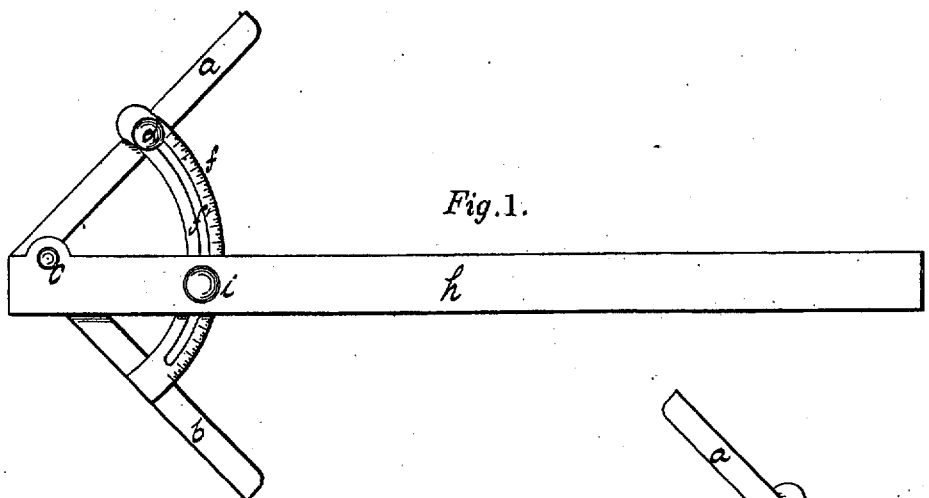
Figure 2:
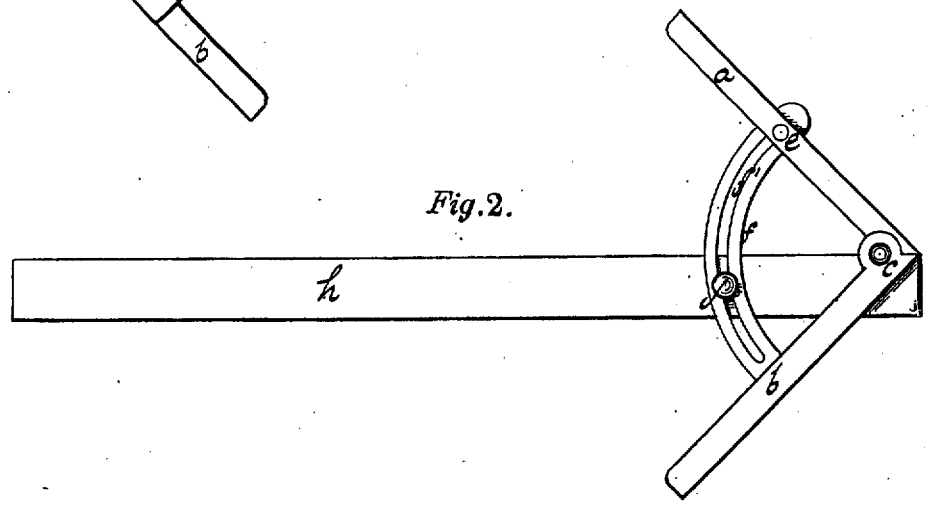

Figure 1 is a top view. Fig. 2 is a bottom view.

The legs $a$ and $b$ are held at a desired adjustment by the set-nut $d$, borne on the screw-pin $e$, rising from the leg $a$, and passing through the slot or mortise $f'$ in the parti-circular rack-arm $f$, which is fast to the leg $b$.

With each different adjustment of the legs $a$ and $b$, the ruler-arm $h$ needs to be adjusted so as to sit midway or centrally between the two legs. To this end the ruler-arm is pivoted on the pivot-pin $c$, and held to a desired adjustment by the set-nut $i$, borne on a screw-pin, $j$, passing through the mortise $f'$, and headed below the arm $f$.

This tool has other uses than that of centering wheels and gears, among which I mention that of a protractor, the arm $f$ being graduated, and the ruler-arm serving as a guide for, and the extension of, the angle-line.

I claim as my invention—

The pivoted legs $a\ b$, the pivoted ruler-arm $h$, and the rack or segmental arc $f$, all combined and designed for operation and use substantially as shown and described.

HORACE B. LITTLE.

Witnesses:
WM. E. SIMONDS,
ROBT. F. GAYLORD.